(12) United States Patent
Lee et al.

(10) Patent No.: US 12,441,186 B2
(45) Date of Patent: Oct. 14, 2025

(54) AUDIO APPARATUS AND VEHICLE HAVING THE SAME

(71) Applicants: HYUNDAI MOTOR COMPANY, Seoul (KR); KIA CORPORATION, Seoul (KR)

(72) Inventors: Sangheun Lee, Seoul (KR); Jaekyu Yu, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 208 days.

(21) Appl. No.: 18/207,997

(22) Filed: Jun. 9, 2023

(65) Prior Publication Data

US 2024/0066987 A1    Feb. 29, 2024

(30) Foreign Application Priority Data

Aug. 30, 2022    (KR) .......................... 10-2022-0108844

(51) Int. Cl.
*B60K 35/28*    (2024.01)
*B60K 35/00*    (2024.01)
(Continued)

(52) U.S. Cl.
CPC .............. *B60K 35/28* (2024.01); *B60K 35/00* (2013.01); *H04H 20/62* (2013.01); *B60K 35/10* (2024.01);
(Continued)

(58) Field of Classification Search
CPC ........ B60K 35/28; B60K 35/00; B60K 35/10; B60K 35/22; B60K 35/26; B60K 35/81;
(Continued)

(56) References Cited

U.S. PATENT DOCUMENTS

| 5,650,788 A | * | 7/1997 | Jha ........................ H01Q 21/065 |
| | | | 343/702 |
| 6,684,054 B1 | * | 1/2004 | Worthy .................. H04H 60/44 |
| | | | 455/150.1 |

(Continued)

FOREIGN PATENT DOCUMENTS

| KR | 20090065095 A | * | 6/2009 | ........... H04N 21/431 |
| KR | 20170053316 A | * | 5/2017 | ........... B60R 16/023 |

OTHER PUBLICATIONS

Translation of KR-20170053316-A, 26 pages (Year: 2017).*
Translation of KR-20090065095-A. 15 pages (Year: 2009).*

*Primary Examiner* — Dale W Hilgendorf
(74) *Attorney, Agent, or Firm* — Morgan, Lewis & Bockius LLP

(57) ABSTRACT

Disclosed are an audio apparatus and a vehicle having the same. The vehicle includes an input device, a display device, an audio apparatus configured to receive a frequency signal, amplify the received frequency signal, and demodulate the amplified frequency signal to output a signal in an audible frequency range, and a controller configured to identify broadcasting information corresponding to the frequency signal received by the audio apparatus and control the display device to display the identified broadcasting information, wherein the broadcasting information includes one or more of a program name, a broadcaster, a broadcasting time, and a broadcasting station name.

18 Claims, 10 Drawing Sheets

(51) Int. Cl.
  *B60K 35/10* (2024.01)
  *B60K 35/22* (2024.01)
  *B60K 35/26* (2024.01)
  *B60K 35/81* (2024.01)
  *H04H 20/62* (2008.01)
  *H04H 60/37* (2008.01)
  *H04H 60/40* (2008.01)
  *H04H 60/44* (2008.01)

(52) U.S. Cl.
  CPC .............. *B60K 35/22* (2024.01); *B60K 35/26* (2024.01); *B60K 35/81* (2024.01); *B60K 2360/1438* (2024.01); *B60K 2360/148* (2024.01); *B60K 2360/166* (2024.01); *H04H 60/372* (2013.01); *H04H 60/40* (2013.01); *H04H 60/44* (2013.01)

(58) Field of Classification Search
  CPC ...... B60K 2360/1438; B60K 2360/148; B60K 2360/166; H04H 20/62; H04H 60/372; H04H 60/40; H04H 60/44
  See application file for complete search history.

(56) References Cited

U.S. PATENT DOCUMENTS

| | | | |
|---|---|---|---|
| 8,660,479 B2* | 2/2014 | Johnson | H04H 40/18 455/550.1 |
| 9,706,250 B2* | 7/2017 | Watanabe | H04N 21/435 |
| 2002/0059636 A1* | 5/2002 | Takeuchi | H04N 21/47214 725/139 |
| 2002/0112239 A1* | 8/2002 | Goldman | H04N 21/25891 348/E7.075 |
| 2002/0183059 A1* | 12/2002 | Noreen | H04H 60/33 455/560 |
| 2004/0248512 A1* | 12/2004 | Munoz | H04B 7/18519 455/12.1 |
| 2006/0010464 A1* | 1/2006 | Azami | H04N 21/4663 725/9 |
| 2006/0126716 A1* | 6/2006 | Williams | H04H 20/62 375/240 |
| 2007/0271591 A1* | 11/2007 | Izumi | H04H 60/44 725/135 |
| 2011/0185383 A1* | 7/2011 | Kelter | H04N 21/4334 725/35 |
| 2014/0200694 A1* | 7/2014 | Kennedy | H04H 60/44 700/94 |
| 2015/0295668 A1* | 10/2015 | Placide | H04H 60/44 455/3.02 |
| 2017/0279551 A1* | 9/2017 | Husmann | H04H 20/93 |
| 2018/0227066 A1* | 8/2018 | Fayyad | G06Q 30/0267 |
| 2018/0332251 A1* | 11/2018 | Pena Placer | H04N 21/4383 |
| 2020/0221226 A1* | 7/2020 | Lee | B60R 11/0264 |
| 2024/0429869 A1* | 12/2024 | Sthalekar | H03F 1/0288 |

* cited by examiner

AUDIO APPARATUS AND VEHICLE HAVING THE SAME

CROSS-REFERENCE TO RELATED APPLICATION(S)

This application is based on and claims priority under 35 U.S.C. § 119 to Korean Patent Application No. 10-2022-0108844, filed on Aug. 30, 2022, in the Korean Intellectual Property Office, the disclosure of which is incorporated by reference herein in its entirety.

TECHNICAL FIELD

The disclosure relates to an audio apparatus for radio listening and a vehicle having the same.

BACKGROUND

In addition to a basic driving function, a vehicle further performs additional functions for user convenience, such as an audio function, a video function, a navigation function, an air conditioning function, a broadcasting function, a seat heating function, and a communication function with an external terminal.

When performing at least one of the audio function, the video function, and the broadcasting function, the vehicle receives a broadcasting signal of any one of traffic broadcasting, news, TV broadcasting, and radio broadcasting transmitted from a broadcasting station, and outputs the received broadcasting signal using at least one of an audio device and a video device.

The audio device outputting a broadcasting signal for radio broadcasting displays only frequency information while outputting a broadcasting signal of a channel selected by a user as sound. Because of this, the user listens to a radio broadcast, but may not know detailed information about a currently output radio broadcast. Also, the user may not know which program will be broadcasted next after a program of the currently output radio broadcast ends.

Also, while listening to a radio broadcast of a selected frequency, the user may not know detailed information about radio broadcasts output on other frequencies.

Because an audio device provided in an existing vehicle does not display detailed information about a radio broadcast, it is inconvenient for a user to listen to a radio broadcast.

SUMMARY

It is an aspect of the disclosure to provide an audio apparatus capable of displaying a radio broadcasting channel, frequency, broadcasting station name, program name, program broadcasting time and broadcaster, and a vehicle having the same.

It is another aspect of the disclosure to provide an audio apparatus capable of displaying a schedule of radio broadcasts and a vehicle having the same.

It is another aspect of the disclosure to provide an audio apparatus capable of searching for broadcasting information based on search information, displaying the searched broadcasting information, and outputting a radio broadcast based on reservation information, and a vehicle having the same.

Additional aspects of the disclosure will be set forth in part in the description which follows and, in part, will be obvious from the description, or may be learned by practice of the disclosure.

In accordance with an aspect of the disclosure, a vehicle includes a display device, a tuner configured to receive a frequency signal, a first amplifier configured to amplify the frequency signal received by the tuner, a detector configured to demodulate the frequency signal amplified by the first amplifier and output a signal in an audible frequency range, a second amplifier configured to amplify the signal in the audible frequency range output from the detector and transmit the amplified signal to a speaker, and a processor configured to identify broadcasting information corresponding to the frequency signal received through the tuner and control the display device to display the identified broadcasting information. The broadcasting information may include one or more of a program name, a broadcaster, a broadcasting time, and a broadcasting station name.

The audio apparatus may further include an input device configured to receive a user input. In response to schedule display command received through the input device, the processor of the audio apparatus may transmit current location information to a server and control the display device to display a schedule received from the server. The schedule may include program names matched for each frequency and each time slot.

In response to search command and search information received through the input device, the processor of the audio apparatus may identify broadcasting information matching the search information among broadcasting information of the schedule based on the schedule and the search information, and control the display device to display the identified broadcasting information.

In response to reservation command and reservation information received through the input device, the processor of the audio apparatus may identify broadcasting information matching the reservation information among broadcasting information of the schedule based on the schedule and the reservation information, store the identified broadcasting information as reserved broadcasting information, and control output of a radio broadcast based on the reserved broadcasting information.

The processor of the audio apparatus may control the display device to display the broadcasting information as a text or a thumbnail image.

The processor of the audio apparatus may identify a program name based on the broadcasting information, identify frequency information of another area, which is different from an area identified based on current location information, outputting a radio broadcast for the identified program name, and control the display device to display the identified frequency information of another area.

In accordance with another aspect of the disclosure, a vehicle includes an input device configured to receive user input, a display device, an audio apparatus configured to receive a frequency signal, amplify the received frequency signal, and demodulate the amplified frequency signal to output a signal in an audible frequency range, and a controller configured to identify broadcasting information corresponding to the frequency signal received by the audio apparatus and control the display device to display the identified broadcasting information. The broadcasting information may include one or more of a program name, a broadcaster, a broadcasting time, and a broadcasting station name.

The vehicle may further include a communication device and a location receiver. The controller of the vehicle may recognize current location information based on a signal received by the location receiver, transmit the current location information to a server, and receive the broadcasting information from the server.

In response to a schedule display command received through the input device, the controller of the vehicle may transmit the current location information to the server and control the display device to display a schedule received from the server. The schedule may include broadcasting information. The broadcasting information of the schedule may include program names matched for each frequency and each time slot.

In response to search command and search information received through the input device, the controller of the vehicle may determines whether broadcasting information broadcasting information matching the search information among the broadcasting information of the schedule is identified based on the schedule and the search information, and in response to determination that the broadcasting information is identified, the controller may control the display device to display the identified broadcasting information. The search information may include one or more of frequency information, the program name, the broadcaster, the broadcasting time, and the broadcasting station name.

In response to determination that the broadcasting information is not identified, the controller of the vehicle may control the display device to display search failure guide information for search failure.

In response to reservation command and reservation information received through the input device, the controller of the vehicle may identify broadcasting information matching the reservation information among the broadcasting information of the schedule based on the schedule and the reservation information, store the identified broadcasting information as reserved broadcasting information, and control output of the audio apparatus based on the reserved broadcasting information. The reservation information may include one or more of frequency information, the program name, the broadcaster, the broadcasting time, and the broadcasting station name.

The controller of the vehicle may identify an area based on the current location information and control the display device to display a list of radio broadcasts available for broadcasting in the identified area.

The controller of the vehicle may transmit the current location information, frequency information for the frequency signal, and the broadcasting information to the server.

The server communicating with the vehicle may store and provide broadcasting information and schedules provided from a plurality of broadcasting stations.

The controller of the vehicle may identify a program name based on the broadcasting information, identify frequency information of another area, which is different from the area identified based on the current location information, outputting a radio broadcast having the identified program name, and control the display device to display the identified frequency information of another area.

The controller of the vehicle may control the display device to display the broadcasting information as a text or a thumbnail image.

The vehicle may further include a voice receiver. The controller of the vehicle may recognize a voice received by the voice receiver and control the audio apparatus based on the recognized voice.

The display device and input device of the vehicle may be provided on a touch screen.

The display device of the vehicle may be provided in a terminal to perform an audio video navigation function.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
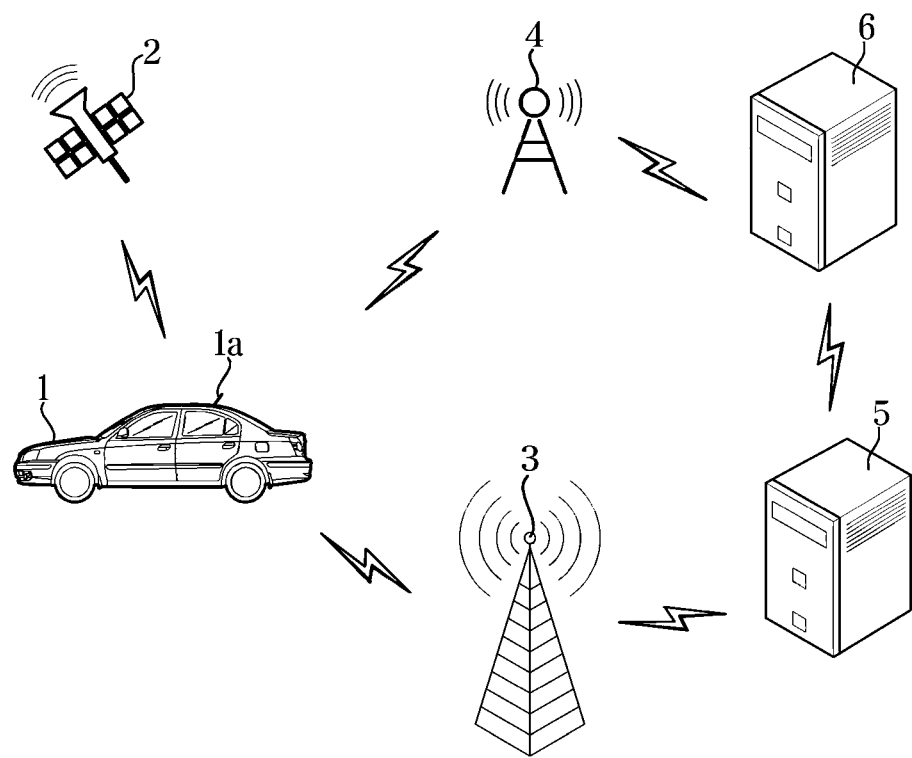
FIG. 1 is an exemplary diagram of vehicle communication according to an embodiment.

Throughout the specification, like reference numerals refer to like elements. This specification does not describe all factors of embodiments, and duplicative contents between general contents or embodiments in the technical field of the disclosure will be omitted. The terms 'member,' 'module,' and 'device' used in this specification may be embodied as software or hardware, and it is also possible for a plurality of 'members,' 'modules,' and 'devices' to be embodied as one component, or one 'member,' 'module,' and 'device' to include a plurality of components according to the embodiments.

Throughout the specification, when a part is referred to as being "connected" to another part, it includes not only a direct connection but also an indirect connection, and the indirect connection includes connecting through a wireless network.

When it is described that a part "includes" an element, it means that the element may further include other elements, not excluding the other elements unless specifically stated otherwise.

The terms 'first,' 'second,' etc. are used to distinguish one element from another element, and the elements are not limited by the above-mentioned terms.

The singular forms "a," an, and the include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter, a principle of action and embodiments of the disclosure will be described with reference to the accompanying drawings.

FIG. 1 is an exemplary diagram of vehicle communication according to an embodiment.

A vehicle 1 may perform communication with a satellite 2, a first infrastructure 3 and a second infrastructure 4.

The vehicle 1 may also perform directly or indirectly communication with a first server 5 and a second server 6.

When communicating with the satellite 2, the vehicle 1 may receive a signal from the satellite 2 and recognize a current location of the vehicle based on the received signal. In this case, the number of the satellites 2 to communicate with the vehicle 1 may be one or two or more.

When recognizing the current location, the vehicle 1 may recognize the current location of the vehicle using a global positioning system (GPS), a global navigation satellite system (GNSS), or a global navigation satellite system (GLONASS).

As an example, the vehicle 1 may obtain distance and time information corresponding to signals of a plurality of GPS satellites when recognizing the current location of the vehicle, and recognize the current location of the vehicle based on the obtained distance and time information.

As another example, the vehicle 1 may receive a signal transmitted from the GNSS satellite and recognize the current location of the vehicle through a distance to the GNSS satellite.

When communicating with the first infrastructure 3, the vehicle 1 may radiate a signal for information to be transmitted as an electromagnetic wave through an antenna 1a of the vehicle 1. That is, the vehicle antenna 1a may emit an electromagnetic wave corresponding to an electrical signal transmitted from a controller 110 provided in the vehicle 1.

The vehicle antenna 1a demodulates an electromagnetic wave received from the first infrastructure 3, converts the demodulated wave into an electrical signal, and transmits the converted electrical signal to the controller 110. In this case, the vehicle 1 may obtain a control signal corresponding to the converted electrical signal and control an operation of the vehicle 1 based on the obtained control signal.

The vehicle antenna 1a may receive an electromagnetic wave signal transmitted from the second infrastructure 4. The vehicle 1 may convert the received electromagnetic wave signal into an electrical signal and output the converted electrical signal.

The vehicle antenna 1a may be an antenna according to a second generation (2G) communication method such as time division multiple access (TDMA) and code division multiple access (CDMA), a third generation (3G) communication method such as wide code division multiple access (WCDMA), code division multiple access 2000 (CDMA2000), Wireless Broadband (WiBro), and world interoperability for microwave access (WiMAX), a fourth generation (4G) communication method such as Long Term Evolution (LTE) and Wireless Broadband Evolution, or a fifth generation (5G) communication method.

A vehicle may transmit frequency and broadcasting station information of a radio broadcast being output from the vehicle to the first server 5 through a connected car service (COS), may transmit vehicle location information to the first server 5, and may also transmit current time information and vehicle identification information to the first server 5.

The satellite 2 transmits a satellite signal to the vehicle 1 so that the vehicle 1 may recognize the current location of the vehicle.

The satellite 2 may be any one of a satellite for the global navigation satellite system (GLASS), a satellite for the global navigation satellite system (GLONASS), and a satellite for the global positioning system (GPS). The one or more satellites 1 may be provided.

The first infrastructure 3 may be provided on a road, perform communication with the first server 5, transmit the information transmitted from the first server 5 to the vehicle 1, and transmit the information transmitted from the vehicle 1 to the first server 5. The information transmitted from the first server 5 may be broadcasting information.

The first infrastructure 3 may receive an electromagnetic wave emitted from the antenna 1a of the vehicle 1, transmit an electrical signal corresponding to the received electromagnetic wave to the first server 5, and convert the electric signal received from the first server 5 into an electromagnetic wave and then emit the converted electromagnetic wave.

The second infrastructure 4 may be provided on a road, perform communication with the second server 6, receive an electromagnetic wave transmitted from the second server 6, and transmit the received electromagnetic wave. The electromagnetic wave transmitted from the second server 6 may be a broadcasting signal for a radio broadcast.

The second infrastructure 4 may be an infrastructure for receiving broadcast signals and transmitting broadcast signals.

The second infrastructure 4 may receive broadcast signals for radio broadcasts transmitted from a plurality of broadcasting stations and transmit the received broadcast signals.

The second infrastructure 4, which is a device for receiving a broadcasting signal received through a broadcasting station, broadcast satellite, cable, Internet, etc., and transmitting the received broadcasting signal, may be a device that receives an external broadcasting signal and transmits the received broadcasting signal again.

The first server 5 receives broadcasting information about a radio broadcast received from the second server 6, stores the received broadcasting information, and transmits the stored broadcasting information to the vehicle 1 through the first infrastructure 3.

In addition, the first server 5 stores the broadcasting information provided from a plurality of the second servers 6, and transmits the stored broadcasting information to the vehicle 1 through the first infrastructure 3.

The broadcasting information may include channel information, frequency information, broadcasting station information, program information, and broadcasting time information, and the program information may include a program name and broadcaster information.

The broadcasting information may be displayed as at least one of text information and image information.

The image information may include a face image of a broadcaster and a symbol image corresponding to a program name.

The first server 5 may receive a schedule of radio broadcasts from the second server 6 of each broadcasting station and may also download a schedule announced on a web page of each broadcasting station.

The first server 5 may store broadcasting information of a radio broadcast from the second server 6 of each broadcasting station as big data and update the broadcasting information by performing machine learning on the big data. The first server 5 may update the schedule.

The first server 5 may transmit broadcasting information of a radio broadcast to the vehicle 1 in response to a request of the vehicle 1.

The first server 5 may transmit the schedule of radio broadcasts to the vehicle 1 in response to a request of the vehicle 1.

The first server 5 may receive current location information of a vehicle, obtain the broadcasting information and schedule of the radio broadcasts based on the received current location information of the vehicle, and transmit the obtained broadcasting information and schedule to the vehicle 1.

The first server 5 may receive current location information of a vehicle, identify current time information, obtain the broadcasting information and schedule of the radio broadcasts based on the received current location information of the vehicle and current time information, and transmit the obtained broadcasting information and schedule to the vehicle 1.

The first server 5 may receive current location information of a vehicle and the frequency information selected by the user, identify the current time information, obtain broadcasting information of a radio broadcast based on the received current location information of the vehicle, the frequency information, and the current time information, and transmit the obtained broadcasting information of the radio broadcast to the vehicle 1.

The first server 5 may receive current location information of a vehicle and the broadcasting station information selected by the user, identify the current time information, obtain broadcasting information of a radio broadcast based on the received current location information of the vehicle, the broadcasting station information, and the current time information, and transmit the obtained broadcasting information of the radio broadcast to the vehicle 1.

The first server 5 may receive current location information, frequency information, and broadcasting information from a plurality of other vehicles other than the vehicle 1, identify an area corresponding to the received current location information, and match and store the identified area, the frequency information, and the broadcasting information.

The first server 5 may receive schedules by area from a plurality of vehicles other than the vehicle 1 and store the received schedules by area.

When receiving a request for provision of broadcasting information, the first server 5 may identify the vehicle identification information and transmit a schedule to the vehicle 1 based on the identified vehicle identification information.

The second server 6, which is a server provided in a broadcasting station, may store broadcasting information about radio broadcasts of the broadcasting station and transmit the stored broadcasting information to the first server 5. The second server 6 may be provided in each of a plurality of the broadcasting stations. That is, a plurality of the second servers 6 may be provided.

The second server 6 may output a broadcasting signal for a radio broadcast. That is, the second server 6 may output a broadcast signal of an ongoing radio broadcast as an electromagnetic wave.

Figure 2:
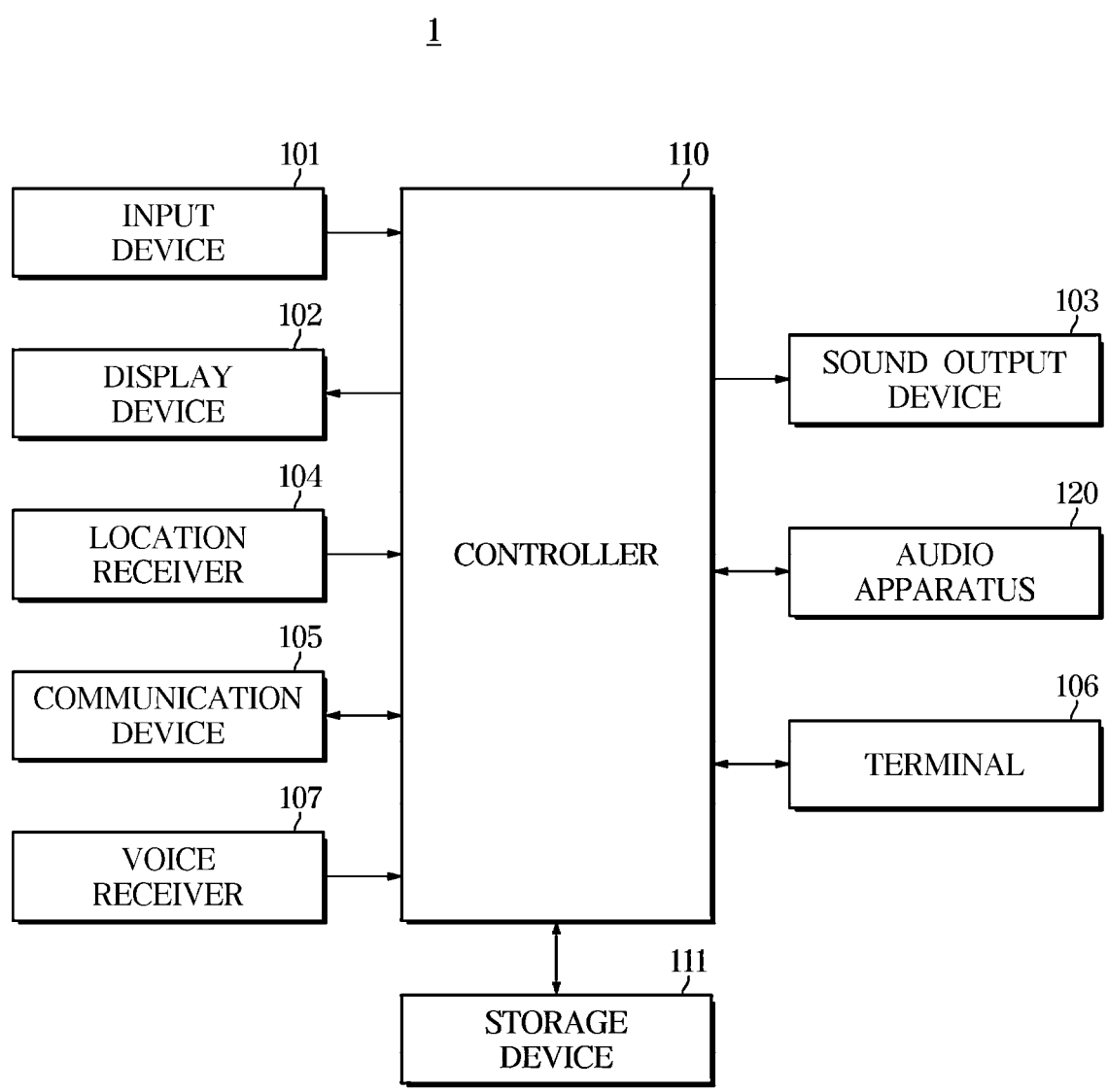
FIG. 2 is a control configuration diagram of a vehicle according to an embodiment.
Figure 3:
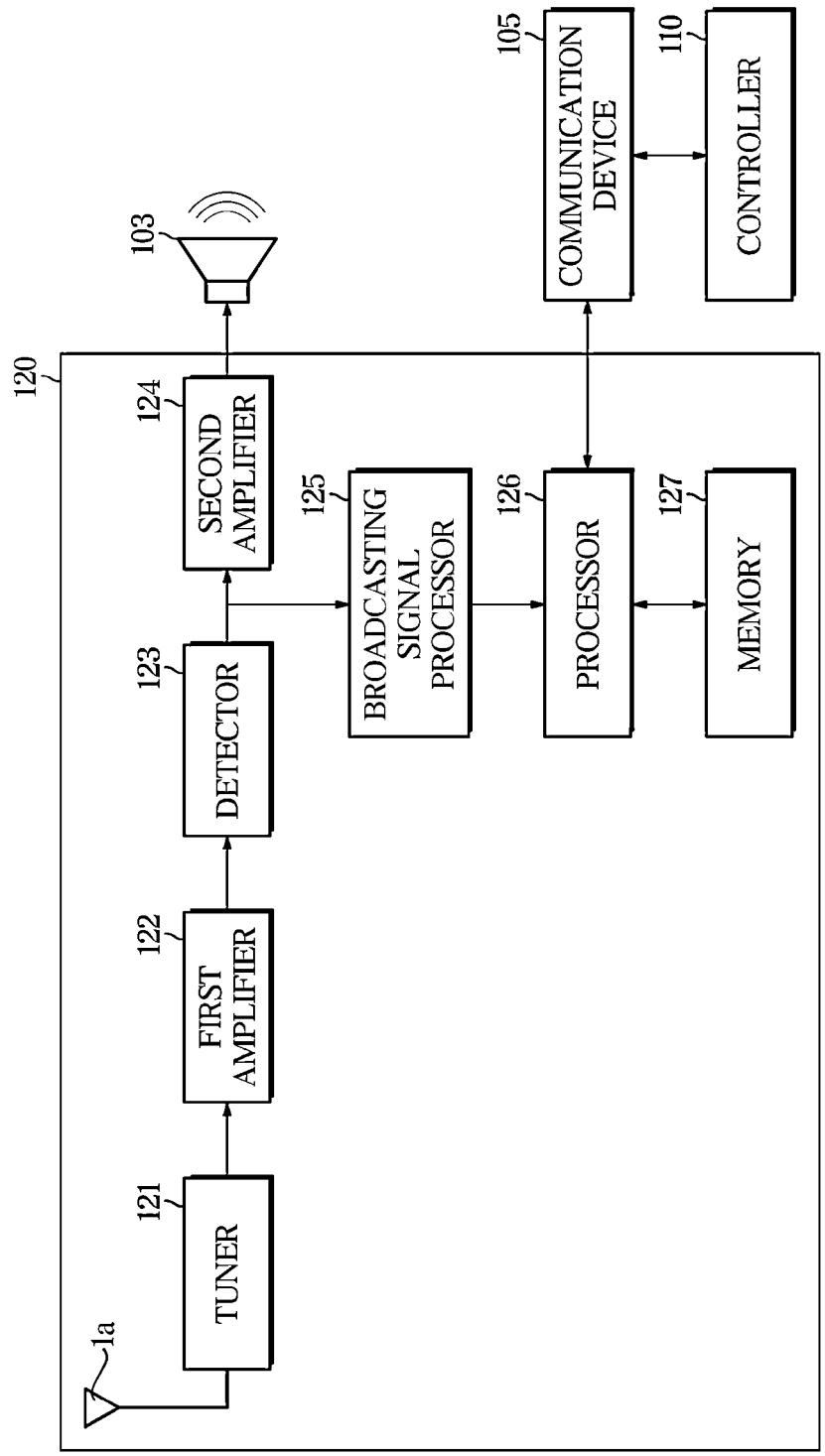
FIG. 3 is a detailed configuration diagram of an audio apparatus provided in the vehicle according to an embodiment.

FIG. 2 is a control configuration diagram of a vehicle according to an embodiment, and FIG. 3 is a detailed configuration diagram of an audio apparatus provided in the vehicle according to an embodiment.

The vehicle 1 includes an input device 101, a display device 102, a sound output device 103, a location receiver 104, a communication device 105, a terminal 106, a voice receiver 107, the controller 110, a storage device 111, and an audio apparatus 120.

The input device 101 receives a user input and transmits input information on the received user input to the controller 110.

The input device 101 may directly transmit the input information on the user input to a processor 126 of the audio apparatus 120 (see FIG. 3).

The input device 101 receives a radio broadcasting mode on/off command and receives frequency information and volume information when a radio broadcasting mode is executed.

The input device 101 may also receive channel information for radio broadcasting output. For example, the channels may include a long wave channel, an AM channel, a shortwave channel, and an FM channel.

The input device 101 may also receive a radio broadcast changing command. The radio broadcast changing command may include a frequency changing command.

The input device 101 may receive a broadcasting information display command while performing the radio broadcasting mode. The broadcasting information display command may be a command to display broadcasting information about a currently output radio broadcasting program.

The broadcasting information display command may be a command to display broadcasting information about a previous program or a command to display broadcasting information about a next program. The previous program is a program corresponding to a frequency lower than a frequency of a currently output program.

The next program is a program corresponding to a frequency higher than a frequency of a currently output program.

The current frequency, a frequency lower than the current frequency, and a frequency higher than the current frequency may be previously stored information in order of magnitude.

The current frequency, a frequency lower than the current frequency, and a frequency higher than the current frequency, which are frequencies receivable in the vehicle, may be ones retrieved in order of magnitude.

The input device 101 may receive a command to display broadcasting information corresponding to frequency information selected by the user.

The input device 101 may receive a command to display broadcasting information about radio broadcasts being conducted by a plurality of broadcasting stations. That is, the input device 101 may receive a schedule display command.

The input device 101 may receive a command to end the display of broadcasting information, may receive a command to end the display of the schedule, and may receive a selection signal for any one of a plurality of pieces of broadcasting information in the schedule.

The input device 101 may receive a radio broadcast reservation command, reservation information, and a radio broadcast search command and search information.

The radio broadcast reservation information may include a broadcasting time and may further include at least one of a broadcasting station name, a broadcaster, a program name, and a frequency.

The radio broadcast search information may include at least one of program information, broadcasting station information, channel information, frequency information, broadcaster information, and broadcasting time information.

The input device 101 may also receive an operation command of the terminal 106. The input device 101 may receive a cursor movement command, a selection command, and the like displayed on the terminal 106.

The input device 101 may be provided on a center fascia and a head unit provided inside a body of the vehicle 1, or may be provided on a steering wheel.

The input device 101 may include a hardware device such as various buttons or switches, a pedal, a keyboard, a mouse, a track-ball, various levers, a handle, and a stick.

The input device 101 may also include a graphical user interface (GUI) such as a touch pad, that is, a software device. The touch pad may be implemented as a touch screen panel (TSP) to form a mutual layer structure with the display device 102.

The display device 102 displays operation information about functions being performed in the vehicle 1.

The display device 102 may display operation information of the head unit and input information input to the input device 101. For example, the display device 102 may display a channel and frequency input by the user and display a volume when the radio broadcasting mode is executed.

The display device 102 may display broadcasting information corresponding to frequency information selected by the user when the radio broadcasting mode is executed.

The display device 102 may display broadcasting information corresponding to another frequency information when the radio broadcasting mode is executed.

The display device 102 may display broadcasting information of a radio broadcast that is output at the current location and a frequency of the same radio broadcast that is output at another region.

The display device 102 may display schedules for radio broadcasts being conducted by a plurality of broadcasting stations when the radio broadcasting mode is executed.

The display device 102 may display reservation information reserved and search information searched.

The display device 102 may display volume information when the radio broadcasting mode is executed.

The display device 102 may be provided on at least one of the center fascia and the head unit provided inside the body of the vehicle 1, or may be provided on a cluster.

The display device 102 may include a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel or an organic light emitting diode (OLED) panel, but is not limited thereto. For example, the display device 102 may include a screen or monitor or be implemented as part of a user interface. In some implementations, the display device 102 may be a touch-sensitive display including a touch-sensitive surface.

The sound output device 103 outputs sound for a function being performed in the vehicle 1 in response to a control command of the controller 110.

For example, the sound output device 103 may output an audio signal of navigation information as sound, may output an audio signal of content or external broadcasting as sound, or may output an audio signal of music or radio broadcasting selected by the user as sound.

When the radio broadcasting mode is executed, the sound output device 103 may output sound with volume information selected by the user in response to a control command of the controller 110.

The sound output device 103 may output an audio signal output from the audio apparatus 120 as sound by being connected to the audio apparatus 120.

The sound output device 103 may also output sounds for reservation completion, search progress, and search completion.

The sound output device 103 may include one or more speakers.

The speaker converts a signal transmitted from a second amplifier 124 (see FIG. 3) of the audio apparatus 120 into vibration of a diaphragm and generates a dense wave in the air to copy sound waves.

The location receiver 104 receives a signal about the current location of a vehicle.

The location receiver 104 may include a satellite signal receiver for receiving signals from a plurality of satellites and a signal processor for signal processing the satellite signals obtained from the satellite signal receiver. The signal processor may include software for obtaining current location information of a vehicle using distance information and time information corresponding to location signals of the plurality of satellites, and an output device for outputting the obtained current location information of the vehicle.

The location receiver 104 may directly transmit the current location information of the vehicle to the processor 126 of the audio apparatus 120.

The communication device 105 may include one or more components enabling communication with an external device, and may include, for example, at least one of a short-range communication module, a wired communication module, and a wireless communication module. The external device may be the satellite 2, the first and second servers 5 and 6, and the first and second infrastructures 3 and 4.

The short-range communication module may include various short-range communication modules that transmit and receive signals using a wireless communication network in a short distance such as a Bluetooth® module, an infrared communication module, a radio frequency identification (RFID) communication module, a wireless local access network ('A/LAN) communication module, a near field communication (NFC) module, and a Zigbee® communication module.

The wired communication module may include various cable communication modules such as a universal serial bus (USB), a high definition multimedia interface (HDMI), a digital visual interface (DVI), a recommended standard 232 (RS-232), a power line communication, and a plain old telephone service (POTS), as well as various wired communication modules such as a controller area network (CAN) communication module, a local area network (LAN) module, a wide area network (WAN) module, and a value added network (VAN) module.

The wireless communication module, in addition to a Wi-Fi module and a wireless broadband module, may include wireless communication modules that support various wireless communication methods such as a global system for mobile communication (GSM), a code division multiple access (COMA), a wideband code division multiple access (WCDMA), a universal mobile telecommunication system (UMTS), a time division multiple access (TDMA), and Long Term Evolution (LTE).

The communication device 105 may perform communication with an external broadcasting station. The communication device 105 may further include a broadcasting communication module such as a TPEG, SXM, and RDS of OMB or like.

According to an exemplary embodiment of the present disclosure, the communication device 105 may include a processor (e.g., computer, microprocessor, CPU, ASIC, circuitry, logic circuits, etc.) and an associated non-transitory memory storing software instructions which, when executed by the processor, provides the functionalities as discussed above. Herein, the memory and the processor may be implemented as separate semiconductor circuits. Alternatively, the memory and the processor may be implemented as a single integrated semiconductor circuit. The processor may embody one or more processor(s).

The terminal 106 may be an AVN device to perform audio, video, and navigation functions.

The terminal 106 may receive a user input and display operation information on at least one function selected by the user.

For example, the terminal 106 may receive a navigation mode-on/off command, and destination information and route selection information when a navigation mode is executed. The terminal 106 may display navigation information.

The terminal 106 may display operation information of a mode being executed, such as a broadcasting mode, an Internet search mode, and a call mode. The broadcasting mode may include the radio broadcasting mode, a terrestrial broadcasting mode, a cable broadcasting mode, a satellite broadcasting mode, an Internet broadcasting mode, an IP broadcasting mode, and a digital multimedia broadcasting (DMB) mode.

The terminal 106 may also display broadcasting information in response to a command of the controller 110 when the radio broadcasting mode is executed.

The terminal 106 may also display broadcasting information transmitted from the audio apparatus 120.

The terminal 106 may include a display panel. In addition, the terminal 106 may include a touch screen in which a touch panel is integrated with the display panel.

The voice receiver 107 receives a voice of the user.

The voice receiver 107 includes one or more microphones.

The voice receiver 107 may also include a microphone array.

The controller 110 may recognize voice from the sound received by the voice receiver 107, recognize a user input based on the recognized voice, and transmit the recognized user input to at least one of the audio apparatus 120 and the terminal 106.

The user input through voice recognition may include the radio broadcast reservation command and reservation information and may include the radio broadcast search command and search information.

The user input through voice recognition may include selection information of any one of a plurality of radio broadcasting programs.

The controller 110 transmits input information input to the input device 101 to at least one of the audio apparatus 120 and the terminal 106.

The controller 110 may also control the operation of the audio apparatus 120 and the terminal 106 based on the input information input to the input device 101.

When the radio broadcasting mode is executed, the vehicle 1 may output a radio broadcast using the audio apparatus 120 or may output a radio broadcast using the terminal 106. In this embodiment, a case in which the radio broadcasting mode is executed through the audio apparatus 120 will be described.

The controller 110 may transmit a received radio broadcasting mode-on command to the audio apparatus 120 when the radio broadcasting mode-on command is received through the input device 101, and may transmit received channel and frequency to the audio apparatus 120 when the channel and frequency are received through the input device 101.

The controller 110 requests the first server 5 to provide broadcasting information when a command to display broadcasting information of a radio broadcast is received through the input device 101.

The controller 110 identifies the current location information and frequency information of the vehicle when requesting the first server 5 to provide broadcasting information, and transmits the identified current location information and frequency information of the vehicle to the first server 5. The controller 110 may transmit the current time information and vehicle identification information together when requesting the first server 5 to provide the broadcasting information.

The controller 110 may also transmit broadcasting station information of a currently output radio broadcast to the first server 5 when requesting the first server 5 to provide the broadcasting information. The broadcasting station information may include a broadcasting station name.

The controller 110 may control the display device 102 or the terminal 106 to display the broadcasting information received from the first server 5.

The controller 110 requests the first server 5 to provide a schedule when a schedule display command is received through the input device 101.

The controller 110 identifies current location information of the vehicle when requesting the first server 5 to provide the schedule, and transmits the identified current location information of the vehicle to the first server 5. The controller 110 may transmit the current time information and vehicle identification information together when requesting the first server 5 to provide the schedule.

The controller 110 may control the display device 102 or the terminal 106 to display the received schedule when the schedule is received from the first server 5.

When the reservation command and reservation information are received through the input device 101, the controller 110 may store the received reservation information and control the output of a radio broadcast based on the stored reservation information. In this case, the reservation information may include frequency information, channel information, program information, broadcasting station information, and broadcaster and broadcasting time information.

The controller 110 may control the output of the radio broadcast based on the stored reservation information and schedule.

The controller 110 may identify reserved broadcasting time information based on the reservation information when the reservation information and reservation command are received through the input device 101, identify a first area where the vehicle is located based on the current location information, predict the location of the vehicle when a current time becomes a reserved broadcasting time based on the current time information, current location information, and route information to the destination, identify a second area corresponding to the predicted location of the vehicle, determine whether the first and second areas are different, determine whether output of a radio broadcast reserved in the second area is possible when it is determined that the first and second areas are different, and change the reservation information into broadcasting information in the second area and store the information when it is determined that the output of the radio broadcast reserved in the second area is possible.

When the current time is the reserved broadcasting time, the controller 110 may control the output of the radio broadcast based on broadcasting information changed in response to a change in area.

The controller 110 may control output of a reserved radio broadcast based on the reservation information when the current time is the reserved broadcasting time.

The controller 110 may also control the output of the reserved radio broadcast based on the reservation information and a schedule in the second area when the current time is the reserved broadcasting time.

The controller 110 may control the output of the reserved radio broadcast based on the reservation information when it is determined that the current time is the reserved broadcasting time and the area has not changed.

The controller 110 may control output of guide information regarding the impossibility of outputting the reserved radio broadcast if it is determined that the output of the reserved radio broadcast is impossible when reaching the second area.

When the search command and search information are received through the input device 101, the controller 110 may search for broadcasting information corresponding to the search information based on the received search information and schedule and control at least one of the display device 102 and the terminal 106 to display the searched broadcasting information. In this case, the search information may further include at least one of the broadcasting time information, channel information, frequency information, broadcasting station information, program information, and broadcaster information. The program information may include a program name, and the broadcasting station information may include a broadcasting station name.

When the reservation command and reservation information are received through the voice receiver 107, the controller 110 may store the received reservation information and control output of a radio broadcast based on the stored reservation information. In this case, the reservation information includes the broadcasting time information, and may further include the channel information and frequency information.

When the reservation command and reservation information are received through the voice receiver 107, the controller 110 may store the received reservation information and control the output of the radio broadcast based on the stored reservation information and schedule. In this case, the reservation information includes the broadcasting time information and program information, and may further include the broadcasting station information and broadcaster information.

When the search command and search information are received through the voice receiver 107, the controller 110 may search for broadcasting information corresponding to the search information based on the received search information and schedule and control at least one of the display device 102 and the terminal 106 to display the searched broadcasting information. In this case, the search information may further include at least one of the broadcasting time information, channel information, frequency information, broadcasting station information, program information, and broadcaster information.

The controller 110 may transmit current location information of the vehicle to the audio apparatus 120.

The controller 110 may also transmit the reservation command; reservation information, search command, and search information received through the input device 101 or the voice receiver 107 to the audio apparatus 120.

The controller 110 may transmit the channel information and frequency information received through the input device 101 or the voice receiver 107 to the audio apparatus 120.

The controller 110 may transmit a broadcasting information display command to the audio apparatus 120 when the broadcasting information display command is received through the input device 101 or the voice receiver 107.

The controller 110 may transmit a received schedule display command to the audio apparatus 120 when the schedule display command is received through the input device 101 or the voice receiver 107.

The controller 110 may control at least one of the display device 102 and the terminal 106 to display broadcasting information or a program schedule transmitted from the audio apparatus 120.

The controller 110 may be an electronic control unit (ECU) provided in the vehicle.

That is, the controller 110 and the processor 126 of the audio apparatus 120 may be implemented as one or may be separately implemented as in the present embodiment.

The controller 110 may be implemented as a memory (not shown) for storing an algorithm for controlling the operations of components inside the vehicle 1 or data for a program reproducing the algorithm and a processor (not shown) for performing the above-described operations using data stored in the memory. In this case, the memory may be implemented as a separate chip from the processor or may be implemented as a single chip with the processor.

The storage device 111 may store vehicle identification information. The vehicle identification information may include a vehicle identification number, manufacturing number, model number, license plate information, vehicle model, model name, and the like, and may further include user information.

The storage device 111 may store reservation information.

The storage device 111 may also store a schedule.

The storage device 111 may store map information in which the areas are divided and store a frequency table for each area of a plurality of broadcasting stations.

The storage device 111 may be implemented as at least one of a non-volatile memory device such as a cache, a ROM (read only memory), a PROM (programmable ROM), an EPROM (erasable programmable ROM), an EEPROM (electrically erasable programmable ROM), and a flash memory, a volatile memory device such as a RAM (random access memory), and a storage medium such as a HDD (hard disk drive) and a CD-ROM, but is limited thereto. The storage device 111 may be a memory implemented as a chip separate from the processor described above in relation to the controller 110, or may be implemented as a single chip with the processor.

The audio apparatus 120 receives an external broadcasting signal and outputs the received broadcasting signal. The audio apparatus 120 may be a radio device (not shown) provided in the head unit, or may be an audio device (not shown) provided in the head unit. The audio apparatus 120 may also be provided in the terminal 106.

The audio apparatus 120 may perform only a function of receiving a frequency signal and outputting a radio broadcast as sound.

The audio apparatus 120 may also receive a frequency signal and output a radio broadcast as sound, display broadcasting information or a schedule based on a user input received by the input device 101 or the voice receiver 107, and perform reservation and search functions. In this case, the audio apparatus 120 may include an input device and a display device. In addition, the audio apparatus 120 may also perform direct communication with the input device and the display device.

The configuration of the audio apparatus 120 will be described with reference to FIG. 3.

As illustrated in FIG. 3, the audio apparatus 120 may include a tuner 121, a first amplifier 122, a detector 123, the second amplifier 124, a broadcasting signal processor 125, the processor 126, and a memory 127. The second amplifier 124 may also be provided in the sound output device 103.

The audio apparatus 120 further includes an input device, a display device, a communication device, and a sound output device, and may further include a location receiver.

The tuner 121 may be connected to a broadcasting antenna and receive a broadcasting signal through the broadcasting antenna. The broadcasting antenna receives broadcasting signals transmitted from a plurality of broadcasting stations.

The tuner 121 may receive a broadcasting signal corresponding to channel information and frequency information selected by the user while the radio broadcasting mode is executed.

The first amplifier 122 amplifies the frequency signal received by the tuner 121.

The detector 123 demodulates the frequency signal amplified by the first amplifier 122 and outputs a signal in an audible frequency range.

The second amplifier 124 is connected between the detector 123 and the sound output device 103, amplifies a signal in the audible frequency range output from the detector 123, and transmits the amplified signal to the speaker, which is the sound output device 103.

The broadcasting signal processor 125 signal-processes the demodulated signal demodulated by the detector 123 and transmits signal processing information to the processor 126.

The broadcasting signal processor 125 may sample the demodulation signal, which is an analog signal output from the detector 123, into a digital signal and obtain a signal strength of the sampled digital signal. The obtained signal strength may be a received signal electric field strength.

When input information is received from the controller 110, the processor 126 may control the execution of the radio broadcasting mode based on the received input information, and may also transmit execution information to the controller 110 while executing the radio broadcasting mode.

The received input information may include a radio broadcasting mode-on command, broadcasting information, volume information, and a radio broadcasting mode-off command, and may include current location information.

The broadcasting information may include at least one of channel information, frequency information, broadcasting station information, program information, broadcasting time information, and broadcaster information.

The processor 126 may activate the tuner 121, the first amplifier 122, the detector 123, and the broadcasting signal processor 125 in response to the radio broadcasting mode-on command.

The processor 126 may control the tuner 121 to receive a broadcasting signal corresponding to channel information and frequency information selected by the user, and may control output of the broadcasting signal received by the tuner 121.

The channel information and frequency information selected by the user may be information received through the input device 101 or the voice receiver 107, The channel information and frequency information selected by the user may be information received through the controller 110.

When at least one broadcasting information of program information, broadcasting station information, broadcast time information, and broadcaster information is received, the processor 126 may identify frequency information corresponding to the received at least one broadcasting information and control the tuner 121 based on the identified frequency information.

The processor 126 may allow the user to listen to a radio broadcast by controlling output of an audio signal within a received broadcasting signal.

The processor 126 may adjust a sound quality outputted while controlling frequency maintenance when the received signal field strength is greater than or equal to a reference received signal field strength, and may automatically control frequency change or display a schedule when the received signal field strength is less than the reference received signal field strength. Adjusting the sound quality may include removing a noise signal from a broadcasting signal.

The processor 126 may determine whether the area is changed based on the current location information when the received signal field strength is less than the reference received signal field strength, identify frequency information for outputting the same radio broadcast as the radio broadcast before the area change based on the schedule in the changed area when it is determined that the area has changed, control the tuner 121 based on the identified frequency information.

The processor 126 may obtain a plurality of big data through the CCS service.

The processor 126 may update the broadcasting information and schedule by performing machine learning based on the big data.

The processor 126 may update the schedule for each area.

The processor 126 may identify frequency information about a frequency signal received through the tuner 121 when a broadcasting information display command is received, identify broadcasting information corresponding to the identified frequency information, and transmit the identified broadcasting information to the controller 110.

The broadcasting information display command may be a command received through the input device 101 or the voice receiver 107.

The broadcasting information display command may be a command received through the controller 110.

The processor 126 may also control the display device 102 or the terminal 106 to display the broadcasting information.

When a schedule display command is received, the processor 126 may request the first server 5 to provide a schedule and transmit the schedule received from the first server 5 to the controller 110.

The processor 126 may also control the display device 102 or the terminal 106 to display the schedule.

The schedule display command may be a command received through the input device 101 or the voice receiver 107.

The schedule display command may be a command received through the controller 110.

The processor 126 may also perform communication with the first server 5 through the communication device 105. The processor 126 may perform communication with the first server 5 through the communication device 105 and the first infrastructure 3 and may also perform communication with the location receiver.

The processor 126 may request the first server 5 to provide broadcasting information or a schedule.

The processor 126 identifies current location information of a vehicle and frequency information when requesting the first server 5 to provide broadcasting information, and transmits the current location information of the vehicle and frequency information identified to the first server 5. The processor 126 may transmit current time information and vehicle identification information together when requesting the first server 5 to provide the broadcasting information.

The processor 126 may also transmit broadcasting station information of a currently output radio broadcast to the first server 5 when requesting the first server 5 to provide the broadcasting information.

The processor 126 may control the display device 102 or the terminal 106 to display the broadcasting information received from the first server 5.

The processor 126 requests the first server 5 to provide a schedule.

The processor 126 identifies current location information of a vehicle when requesting the first server 5 to provide the schedule and transmits the current location information of the vehicle identified to the first server 5. The processor 126 may transmit the current time information and vehicle identification information together when requesting the first server 5 to provide the schedule.

The processor 126 may control the display device 102 or the terminal 106 to display the received schedule when the schedule is received from the first server 5.

When the reservation command and reservation information are received, the processor 126 may store the received reservation information and control output of a radio broadcast based on the stored reservation information. In this case, the reservation information may include frequency information, channel information, program information, broadcasting station information, broadcaster information, and broadcasting time information.

The processor 126 may control the output of the radio broadcast based on the stored reservation information and schedule.

When the reservation information and reservation command are received, the processor 126 may identify reserved broadcasting time information based on the reservation information, predict the location of the vehicle when the current time becomes the reserved broadcasting time based on current time information, current location information, and route information to a destination, and control the output of the radio broadcast based on the predicted location of the vehicle and reservation information.

When the search command and search information are received, the processor 126 may search for broadcasting information corresponding to the search information based on the received search information and the schedule and control at least one of the display device 102 and the terminal 106 to display the searched broadcasting information. In this case, the search information may include at least one of broadcasting time information, channel information, frequency information, broadcasting station information, program information, and broadcaster information.

The search command, search information, reservation command and reservation information may be received through the input device 101 or the voice receiver 107.

The search command, search information, reservation command and reservation information may be received through the controller 110.

The processor 126 may also identify current location information of the vehicle based on a broadcasting list display command and display a radio broadcasting list audible at the current location based on the identified current location information of the vehicle.

The memory 127 may store a schedule and may further store vehicle identification information.

The memory 127 may also store a schedule for each area.

At least one component may be added or deleted depending on the performance of components of the vehicle illustrated in FIGS. 2 and 3. It will be easily understood by those skilled in the art that the mutual positions of the components may be changed depending on the performance or structure of the system.

Each component illustrated in FIGS. 2 and 3 means a software and/or hardware component such as a field programmable gate array (FPGA) and application specific integrated circuit (ASIC).

Components controllable by the controller 110 of the vehicle 1 and components controllable by the processor 126 of the audio apparatus 120 have been described with reference to FIGS. 2 and 3.

However, depending on the function of the processor 126 of the audio apparatus 120, the configuration for operation between the controller 110 of the vehicle 1 and the processor 126 of the audio apparatus 120 may be different. This will be briefly described.

An example in which the processor 126 of the audio apparatus 120 performs only a function for outputting a radio broadcast will be described.

The controller 110 of the vehicle may identify a user input received by the input device 101 and a user input corresponding to a voice received by the voice receiver 107 and output a radio broadcast by controlling the audio apparatus 120 based on the identified user input.

The processor 126 of the audio apparatus 120 may output a radio broadcast by identifying frequency information corresponding to a user input and controlling the tuner 121 based on the identified frequency information.

The controller 110 of the vehicle may perform communication with the first server 5 through the first infrastructure 3, transmit frequency information, current location information, vehicle identification information, and current time information to the first server 5, and control at least one of the display device 102 and the terminal 106 to output the broadcasting information and schedule received from the first server 5.

The controller 110 of the vehicle may reserve a radio broadcast based on the reservation command and reservation information and control the radio device 120 based on the reservation information.

The controller 110 of the vehicle may search for broadcasting information about a radio broadcast based on the search command and search information and control at least one of the display device 102 and the terminal 106 to display the searched broadcasting information.

An example in which the processor 126 of the audio apparatus 120 performs various control functions in addition to the function for outputting a radio broadcast will be described.

The controller 110 of the vehicle identifies a user input received by the input device 101 and a user input corresponding to a voice received by the voice receiver 107, and transmits the identified user input to the audio apparatus 120. The user input may include the radio broadcasting mode-on/off command, reservation command, reservation information, search information, search command, and broadcasting information.

The processor 126 of the audio apparatus 120 may output a radio broadcast by identifying frequency information corresponding to a user input and controlling the tuner 121 based on the identified frequency information.

The processor 126 of the audio apparatus 120 may perform communication with the first server 5 through the first infrastructure 3, transmit frequency information, current location information, vehicle identification information, and current time information to the first server 5, and transmit the broadcasting information and schedule received from the first server 5 to the controller 110.

In this case, the controller 110 may control at least one of the display device 102 and the terminal 106 to display the broadcasting information and schedule received from the processor 126.

The processor 126 of the audio apparatus 120 may directly control at least one of the display device 102 and the terminal 106 to display the broadcasting information and schedule received from the first server 5.

The processor 126 of the audio apparatus 120 may reserve a radio broadcast based on the reservation command and reservation information, control output of a radio broadcast based on the reservation information, and search a radio broadcast based on the search command and search information.

The processor 126 of the audio apparatus 120 may transmit broadcasting information about the searched radio broadcast to the controller 110. The controller 110 may control at least one of the display device 102 and the terminal 106 to display the received broadcasting information.

An operation sequence of the audio apparatus provided in the vehicle will be described with reference to FIGS. 4A and 4B.

Figure 4A:
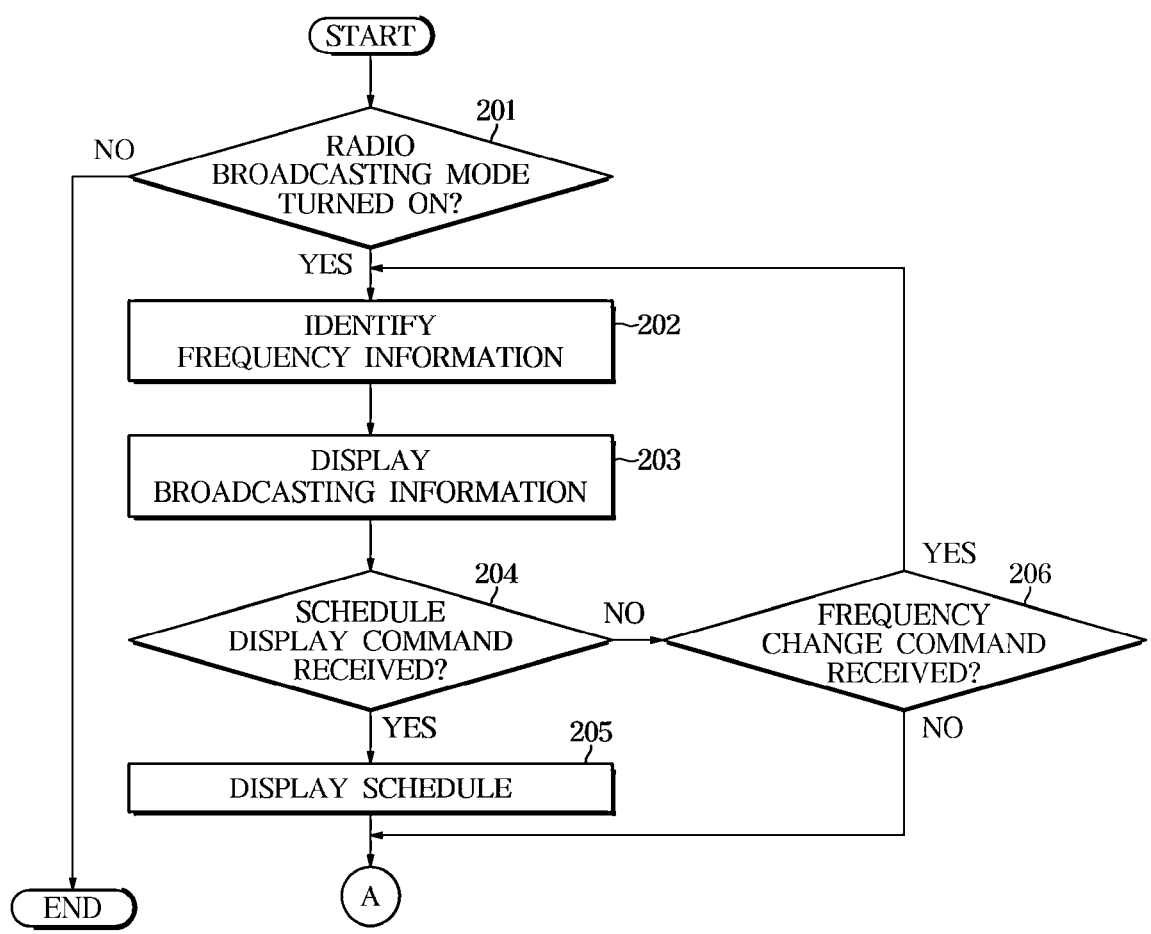
FIGS. 4A and 4B are control flowcharts of the audio apparatus provided in the vehicle according to an embodiment.
Figure 4B:
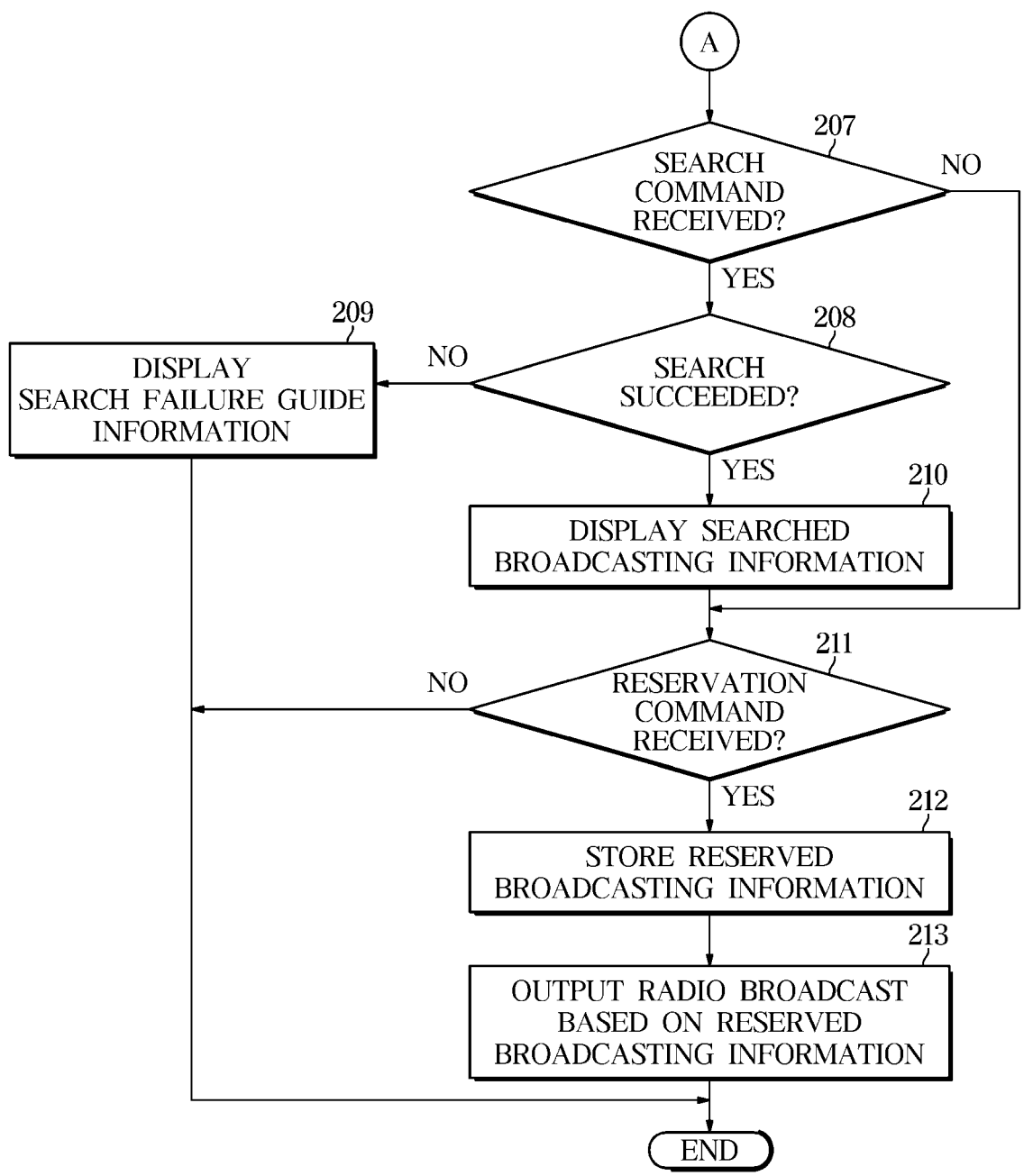
Figure 6:
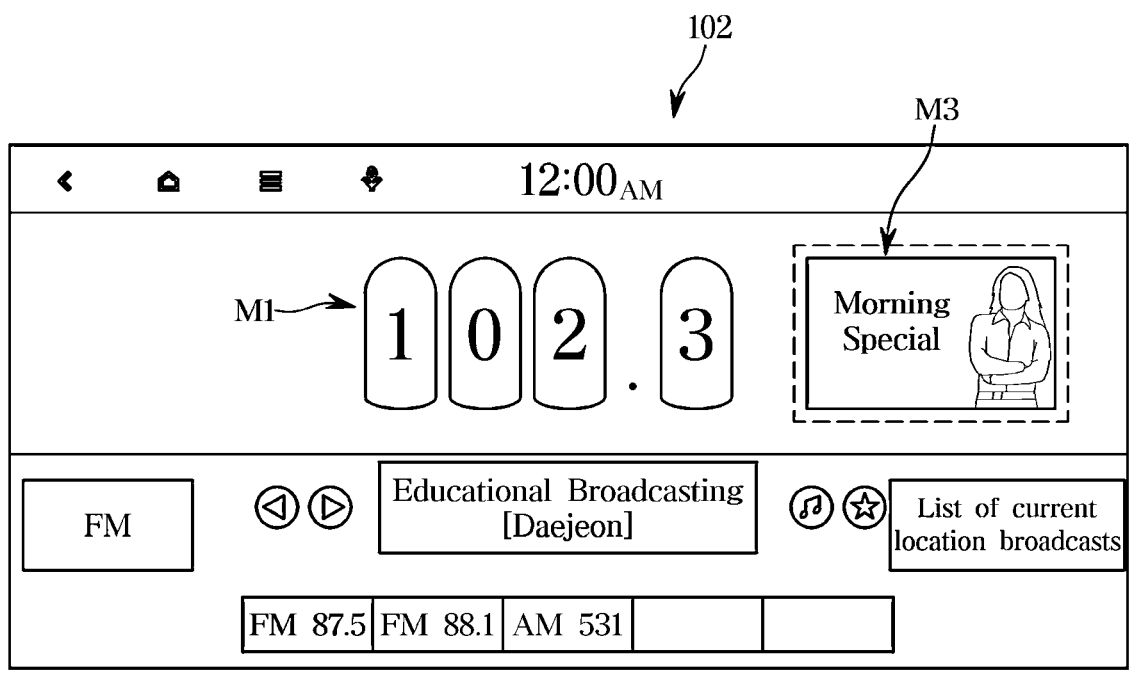
Figure 7:
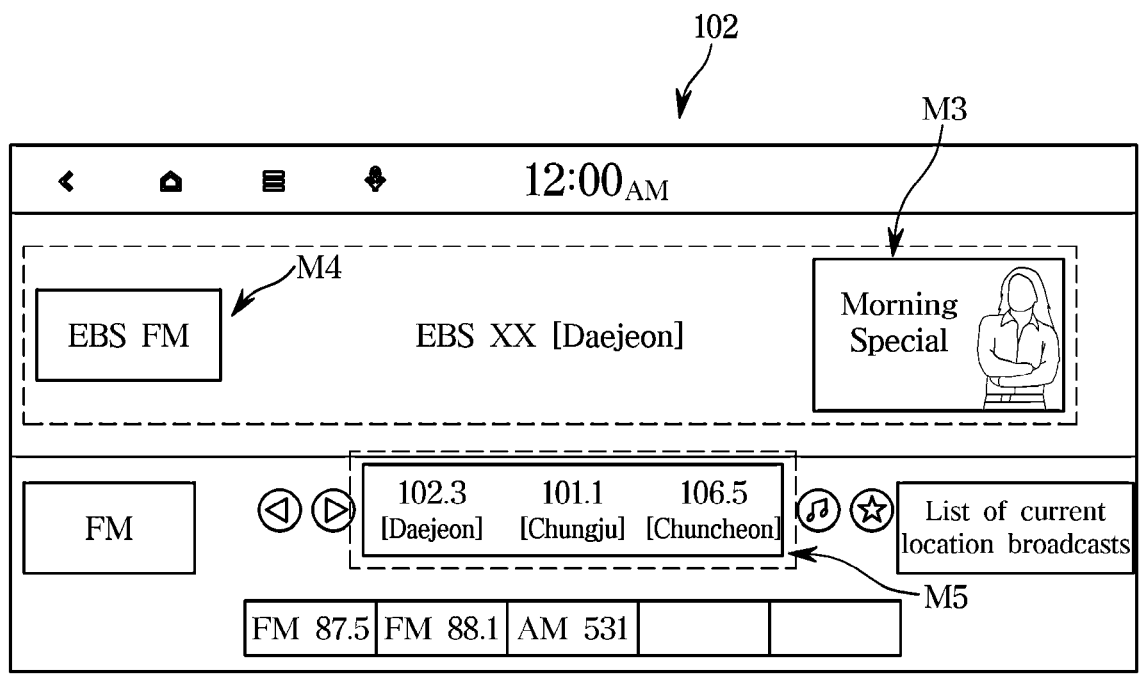
Figure 8A:
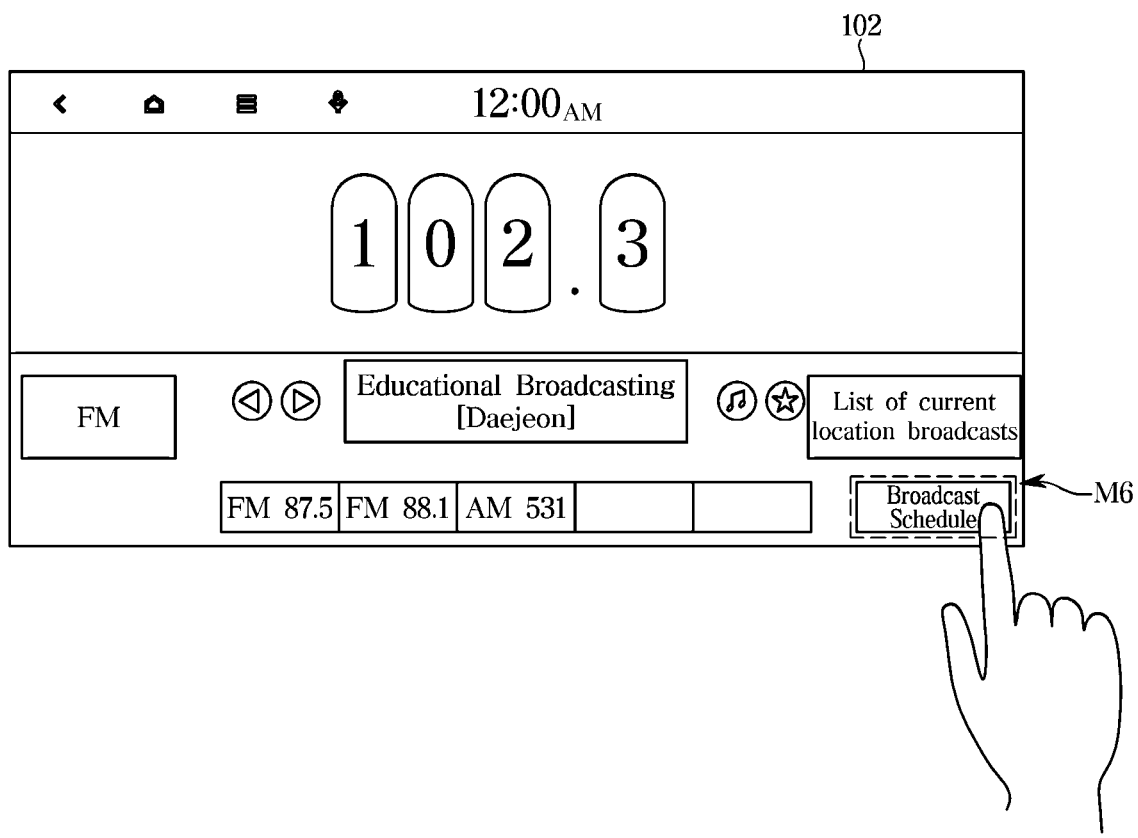
FIGS. 8A and 8B are exemplary diagrams of displaying a schedule on the display device provided in the vehicle according to an embodiment.
Figure 8B:
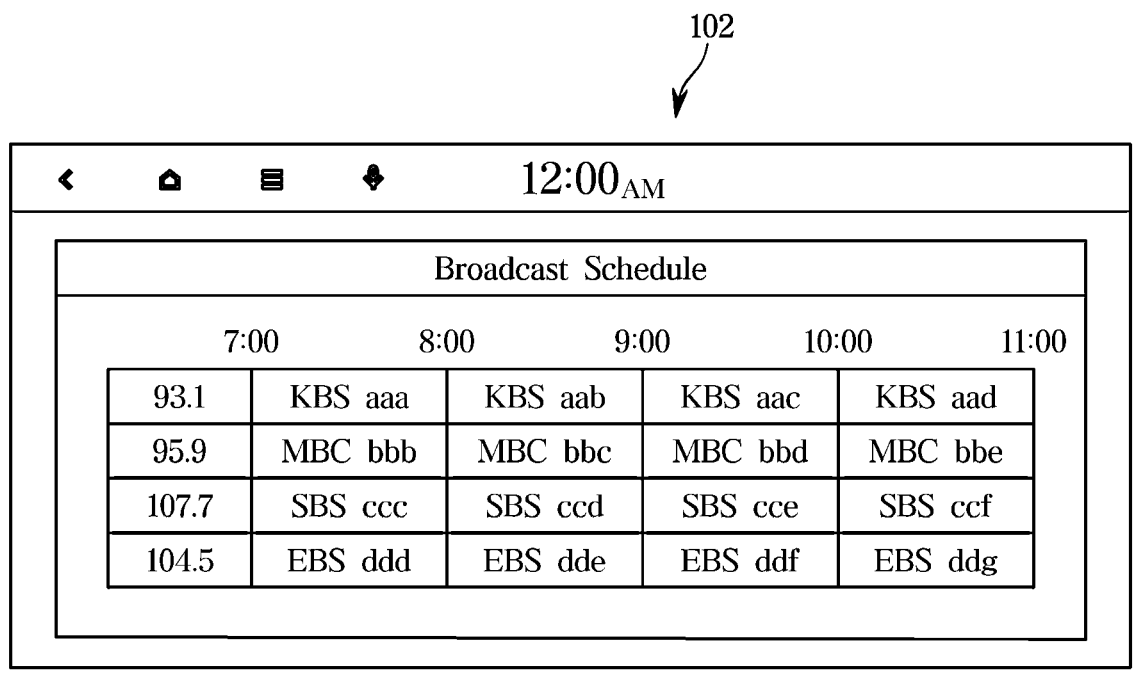

FIGS. 4A and 4B are control flowcharts of the audio apparatus provided in the vehicle according to an embodiment, and will be described with reference to FIGS. 5 to 7 and FIGS. 8A and 8B, FIGS. 5 to 7 are exemplary diagrams of displaying broadcasting information on a display device provided in the vehicle according to an embodiment, and FIGS. 8A and 8B are exemplary diagrams of displaying a schedule on the display device provided in the vehicle according to an embodiment.

An example in which the audio apparatus 120 directly communicates with the input device 101, the voice receiver 107, and the display device 102 provided in the vehicle 1 will be described.

The audio apparatus may activate the tuner 121, the first amplifier 122, the detector 123, and the second amplifier 124 to execute the radio broadcasting mode when a radio broadcasting-on mode is received through the input device 101. In some embodiments, if the radio broadcast mode is not activated, the corresponding process may be terminated (201).

The audio apparatus identifies the frequency information selected by the user (202) and transmits the identified frequency information and current location information of the vehicle to the first server 5.

The audio apparatus displays the broadcasting information received from the first server 5 through the display device 102 (203).

The broadcasting information may include broadcasting station information, program information, broadcasting time information, and broadcaster information corresponding to frequency information selected by the user. The broadcasting station information may include a broadcasting station name, and the program information may include a program name.

The broadcasting time information may include information about a start time and an end time of broadcasting a program currently being output.

The audio apparatus may display broadcasting information as at least one of a text and image. An example of displaying the broadcasting information will be described with reference to FIGS. 5 to 7.

Figure 5:
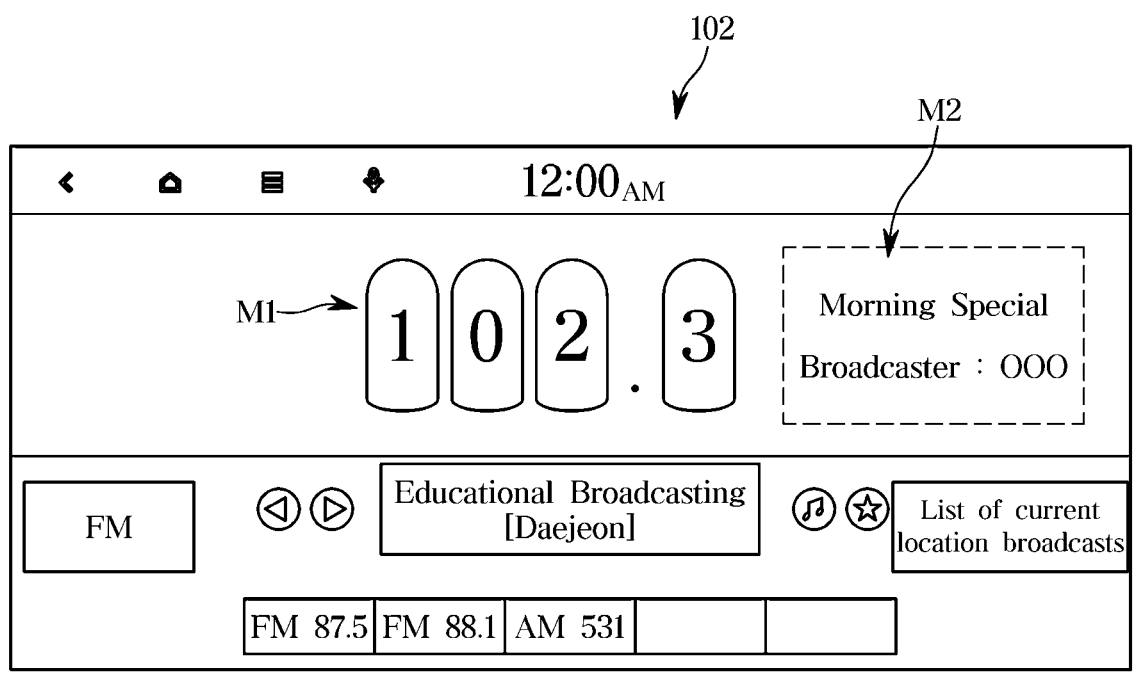
FIGS. 5 to 7 are exemplary diagrams of displaying broadcasting information on a display device provided in the vehicle according to an embodiment.

As illustrated in FIG. 5, the display device 102 may display frequency information M1 selected by the user, display channel information and a broadcasting station name, and additionally display a program name and broadcaster name as broadcasting information M2, but display them as texts.

As illustrated in FIG. 6, the display device 102 may display the frequency information M1 selected by the user, display the channel information and broadcasting station name, and additionally display thumbnail image M3 as the broadcasting information M2.

The thumbnail image M3 may be an image in which a picture of a broadcaster and a symbol corresponding to a program name are matched.

The thumbnail image M3 may be a photo image of a broadcaster.

The thumbnail image M3 may be a symbol image corresponding to a program name.

As illustrated in FIG. 7, the display device 102 may display a plurality of thumbnail images as broadcasting information. The first thumbnail image M3 may be an image in which a picture of a broadcaster and a symbol corresponding to a program name are matched. A second thumbnail image M4 may be a symbol image corresponding to a broadcasting station name.

As illustrated in FIG. 7, the display device 102 may also display frequency information M5 of another area outputting the same program as a currently output program as broadcast information.

The audio apparatus transmits the current location information of the vehicle to the first server 5 when the schedule display command is received through the input device or the voice receiver (204). In this case, the audio apparatus may also transmit the vehicle identification information and current time information to the first server 5.

As illustrated in FIG. 8A, in a case where the input device and the display device are touch screens, the audio apparatus may identify a touch position of a received touch signal when the touch signal is received through the touch screen and determine that the schedule display command has been received when it is determined that the identified touch position is a display position of a schedule button M6.

The audio apparatus may also recognize a voice received by the voice receiver 107 and determine whether the recognized voice is the schedule display command.

In a case where the input device is provided as a plurality of buttons, the audio apparatus may determine that the schedule display command has been received when a manipulation signal of the schedule button is received.

The audio apparatus displays the schedule received from the first server 5 through the display device 102 (205).

As illustrated in FIG. 8B, the display device 102 may display a schedule of radio broadcasts in which program names for each frequency and each broadcasting time slot are displayed.

At step 204, if the schedule display command is not received, The audio apparatus determines whether a frequency change command has been received through the input device 101 or the voice receiver 107 (206), identifies changed frequency information when it is determined that the frequency change command has been received, outputs a radio broadcast based on the identified frequency information, and displays broadcast information corresponding to the frequency information. If it is determined that the frequency change command has not been received, the process may proceed to step 207.

The audio apparatus determines whether the search command has been received through the input device 101 (207), and identifies search information received through the input device 101 when it is determined that the search command has been received. If the search command is not received, the process may proceed to step 211.

The audio apparatus may perform voice recognition on a voice received through the voice receiver 107, determine whether there is the search command in the recognized voice in response to a result of the voice recognition, and recognize search information from the recognized voice when it is determined that there is the search command in the voice.

The audio apparatus performs a search for broadcasting information based on the identified search information and the schedule.

The audio apparatus determines whether there is broadcasting information matching the search information among the schedule information (208), and determines that the search has been succeeded when it is determined that there is broadcasting information matching the search information (208), and determines that the search has failed when it is determined that there is no broadcasting information matching the search information.

The audio apparatus may display search failure guide information for guiding search failure (207) in response to the search failure, and may subsequently terminate the process (209).

The audio apparatus displays the searched broadcasting information through the display device 102 when it is determined that the search has been succeeded (210).

The searched broadcasting information includes at least one of program information, broadcasting time information, broadcaster information, and broadcasting station information, and may further include frequency information and channel information.

The audio apparatus determines whether the reservation command has been received through the input device 101 (211), identifies the reservation information received through the input device 101 when it is determined that the reservation command has been received, and identifies whether there is broadcasting information matching the identified reservation information based on the reservation information and the schedule. If a reservation command is not received (211), the process can be terminated.

The audio apparatus performs voice recognition on a voice received through the voice receiver 107, determines whether there is the reservation command in the recognized voice in response to the result of the voice recognition, identifies reservation information from the recognized voice when it is determined that there is the reservation command in the voice, and identifies whether there is broadcasting information matching the identified reservation information based on the identified reservation information and the schedule.

The audio apparatus may store the broadcasting information matching the reservation information as the reserved broadcasting information when it is determined that there is the broadcasting information matching the reservation information (212).

The reserved broadcasting information includes at least one of program information, broadcasting time information, broadcaster information, and broadcasting station information, and may further include frequency information and channel information.

The audio apparatus may determine whether the current time is a reserved broadcasting time based on the current time information and reservation information, and output a radio broadcast based on the reserved broadcasting information when it is determined that the current time is the reserved broadcasting time (213).

As is apparent from the above, according to the disclosure, by displaying broadcasting information of a radio broadcast corresponding to a frequency selected by a user, information about a radio broadcast being listened to can be easily recognized by the user.

Furthermore, according to the disclosure, by displaying a schedule of a plurality of radio broadcasts, broadcasting information for each frequency and time can be easily recognized by the user, and any one of a plurality of radio broadcasts can be easily selected by the user.

Furthermore, according to the disclosure, by outputting a radio broadcast based on reservation information, user satisfaction and convenience can be improved.

Furthermore, according to the disclosure, by searching for broadcasting information based on search information and displaying the searched broadcasting information, a search time for searching radio broadcasts can be reduced, and a process of manipulating a frequency change button for searching the radio broadcasts can be omitted. In addition, by omitting the process of manipulating the frequency change button, a degree of concentration of driving can be improved.

As such, the disclosure can improve the quality and marketability of an audio apparatus and a vehicle having the same, and can further increase user satisfaction, improve vehicle safety, and secure product competitiveness.

The disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes any type of recording medium in which instructions readable by the computer are stored. For example, the recording medium may include a read only memory (ROM), a random access memory (RAM), a magnetic tape, a magnetic disk, a flash memory, an optical data storage device, and the like.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:

1. An audio apparatus comprising:
a display device;
a tuner configured to receive a frequency signal;
a first amplifier configured to amplify the frequency signal received by the tuner;
a detector configured to demodulate the frequency signal amplified by the first amplifier and output a signal in an audible frequency range;
a second amplifier configured to amplify the signal in the audible frequency range output from the detector and transmit the amplified signal to a speaker; and
a processor configured to identify broadcasting information corresponding to the frequency signal received through the tuner and control the display device to display the identified broadcasting information, wherein the broadcasting information includes one or more of a program name, a broadcaster, a broadcasting time, and a broadcasting station name, wherein in response to reservation command and reservation information received through the input device, the processor identifies broadcasting information matching the reservation information among broadcasting information of a schedule based on the schedule and the reservation information, stores the identified broadcasting information as reserved broadcasting information, and controls output of a radio broadcast based on the reserved broadcasting information, wherein the processor is further configured to identify a first area corresponding to a current location, identify a second area corresponding to a location at a scheduled broadcast time based on current time information, current location information, and route information to a destination, and, when the first area and the second area are different from each other, change the reserved broadcasting information to broadcasting information corresponding to the second area.

2. The audio apparatus according to claim 1, further comprising:

an input device configured to receive user input, wherein in response to the schedule display command received through the input device, the processor transmits the current location information to a server and controls the display device to display the schedule received from the server, and wherein the schedule includes program names matched for each frequency and each time slot.

3. The audio apparatus according to claim 2, wherein in response to search command and search information received through the input device, the processor identifies broadcasting information matching the search information among broadcasting information of the schedule based on the schedule and the search information, and controls the display device to display the identified broadcasting information.

4. The audio apparatus according to claim 1, wherein the processor controls the display device to display the broadcasting information as a text or a thumbnail image.

5. The audio apparatus according to claim 1, wherein the processor identifies the program name based on the broadcasting information, identifies frequency information of another area, which is different from an area identified based on current location information, outputting a radio broadcast for the identified program name, and controls the display device to display the identified frequency information of another area.

6. A vehicle comprising:

an input device configured to receive user input;

a display device;

an audio apparatus configured to receive a frequency signal, amplify the received frequency signal, and demodulate the amplified frequency signal to output a signal in an audible frequency range; and a controller configured to identify broadcasting information corresponding to the frequency signal received by the audio apparatus and control the display device to display the identified broadcasting information, wherein the broadcasting information includes one or more of a program name, a broadcaster, a broadcasting time, and a broadcasting station name, wherein in response to reservation command and reservation information received through the input device, the controller identifies broadcasting information matching the reservation information among broadcasting information of a schedule based on the schedule and the reservation information, stores the identified broadcasting information as reserved broadcasting information, and controls output of a radio broadcast based on the reserved broadcasting information, wherein the controller is further configured to identify a first area corresponding to a current location, identify a second area corresponding to a location at a scheduled broadcast time based on current time information, current location information, and route information to a destination, and, when the first area and the second area are different from each other, change the reserved broadcasting information to broadcasting information corresponding to the second area.

7. The vehicle according to claim 6, further comprising:

a communication device; and a location receiver, wherein the controller recognizes the current location information based on a signal received by the location receiver, transmits the current location information to a server, and receives the broadcasting information from the server.

8. The vehicle according to claim 7, wherein in response to the schedule display command received through the input device, the controller transmits the current location information to the server and controls the display device to display the schedule received from the server, and wherein the schedule includes broadcasting information, and the broadcasting information of the schedule includes program names matched for each frequency and each time slot.

9. The vehicle according to claim 8, wherein in response to search command and search information received through the input device, the controller determines whether broadcasting information matching the search information among the broadcasting information of the schedule is identified based on the schedule and the search information, and in response to determination that the broadcasting information is identified, the controller controls the display device to display the identified broadcasting information, and wherein the search information includes one or more of frequency information, the program name, the broadcaster, the broadcasting time, and the broadcasting station name.

10. The vehicle according to claim 9, wherein in response to determination that the broadcasting information is not identified, the controller controls the display device to display search failure guide information for search failure.

11. The vehicle according to claim 7, wherein the controller identifies an area based on the current location information and controls the display device to display a list of radio broadcasts available for broadcasting in the identified area.

12. The vehicle according to claim 11, wherein the controller identifies the program name based on the broadcasting information, identifies frequency information of another area, which is different from the area identified based on the current location information, outputting a radio broadcast having the identified program name, and controls the display device to display the identified frequency information of another area.

13. The vehicle according to claim 7, wherein the controller transmits the current location information, frequency information for the frequency signal, and the broadcasting information to the server.

14. The vehicle according to claim 7, wherein the server stores and provides broadcasting information and schedules provided from a plurality of broadcasting stations.

15. The vehicle according to claim 6, wherein the controller controls the display device to display the broadcasting information as a text or a thumbnail image.

16. The vehicle according to claim 6, further comprising:
a voice receiver,
wherein the controller recognizes a voice received by the voice receiver and controls the audio apparatus based on the recognized voice.

17. The vehicle according to claim 6, wherein the display device and the input device are provided on a touch screen.

18. The vehicle according to claim 6, wherein the display device is provided in a terminal to perform an audio video navigation function.

* * * * *